(12) United States Patent
Gotthelf

(10) Patent No.: US 6,986,338 B2
(45) Date of Patent: Jan. 17, 2006

(54) FLUID FLOW PRESSURE REGULATOR

(75) Inventor: Jeffrey Bryan Gotthelf, Summerville, SC (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 11/017,465

(22) Filed: Dec. 20, 2004

(65) Prior Publication Data
US 2005/0145280 A1 Jul. 7, 2005

Related U.S. Application Data

(62) Division of application No. 10/304,839, filed on Nov. 26, 2002, now abandoned.

(51) Int. Cl.
G05D 16/10 (2006.01)

(52) U.S. Cl. .......... 123/460; 123/463; 137/484.8; 137/505.14; 137/505.18; 137/505.26

(58) Field of Classification Search .......... 137/484.8 I, 137/505.14, 505.18, 505.26, 505.37; 123/460, 123/463
See application file for complete search history.

(56) References Cited

U.S. PATENT DOCUMENTS

| | | | |
|---|---|---|---|
| 2,047,101 A | 7/1936 | Grove | |
| 3,504,698 A * | 4/1970 | Frill | 137/505.14 |
| 3,650,254 A | 3/1972 | McJones | |
| 3,658,082 A * | 4/1972 | DiTirro | 137/484.8 |
| 3,741,240 A | 6/1973 | Berriman | |
| 3,951,120 A | 4/1976 | Schlott | |
| 4,020,810 A | 5/1977 | Baverstock | |
| 4,369,751 A | 1/1983 | Batchelor et al. | |
| 4,370,969 A | 2/1983 | Zarelli et al. | |
| 4,541,397 A | 9/1985 | Young | |
| 4,543,935 A * | 10/1985 | Tuckey | 123/463 |
| 4,693,267 A | 9/1987 | Patterson | |
| 4,745,904 A * | 5/1988 | Cagle | 123/512 |
| 4,895,184 A | 1/1990 | Abbey | |
| 5,025,758 A | 6/1991 | Djurdjevic | |
| 5,234,026 A | 8/1993 | Patterson | |
| 5,285,810 A | 2/1994 | Gotthelf | |
| 5,372,159 A | 12/1994 | Ziegelmeyer et al. | |
| 5,474,053 A | 12/1995 | Suzuki | |
| 5,509,390 A | 4/1996 | Tuckey | |
| 5,529,048 A | 6/1996 | Kurihara et al. | |
| 5,694,975 A | 12/1997 | Eidsmore | |
| 5,785,023 A | 7/1998 | Cross | |
| 5,797,379 A | 8/1998 | Sharples | |
| 5,868,121 A | 2/1999 | Brown et al. | |
| 6,019,087 A | 2/2000 | Graves | |
| 6,079,434 A | 6/2000 | Reid et al. | |
| 6,178,952 B1 | 1/2001 | Lammerts et al. | |

* cited by examiner

Primary Examiner—Stephen M. Hepperle
(74) Attorney, Agent, or Firm—RatnerPrestia

(57) ABSTRACT

A fuel vapor pressure regulator by which the input pressure of an input fluid is regulated by the opening and closing of a valve unit controlled by a piston pressure sensor, the operation of which is, in turn, controlled by a movement of a preset bias, the output pressure of the fluid delivered by the regulator, and a biasing pressure that reflects the operating demands of the utilization unit to which the fluid is delivered.

11 Claims, 2 Drawing Sheets

FLUID FLOW PRESSURE REGULATOR

This application is a divisional of U.S. patent application Ser. No. 10/304,839 filed Nov. 26, 2002, now abandoned, entitled FLUID FLOW PRESSURE REGULATOR.

FIELD OF THE INVENTION

The present invention relates, in general, to the regulation of the pressure of a fluid flow and, in particular, to a fluid flow pressure regulator for use in regulating the pressure of liquid petroleum gas delivered for the fueling of a vehicle.

BACKGROUND OF THE INVENTION

There are a wide variety of units, known to those skilled in art, for metering fluids in amounts needed to meet the operational requirements of the equipment to which the fluids are delivered. Currently, the regulators of liquid petroleum gas fueled vehicles typically include an integral vaporizer to generate saturated vapor that is burned as fuel in the engine of the vehicle. Other regulators, differently arranged, are used in vapor fed systems in conjunction with a discrete vaporizer to provide the liquid petroleum gas to the regulator and, in turn, to the engine to burn as fuel. These regulators have a fixed output pressure.

Many of the liquid petroleum gas regulators known to those skilled in the art fall short of operating with the desired efficiency. This is so because the regulators function without control of the changing operational requirements of the engine to which the liquid petroleum gas vapor is supplied.

In contrast, U.S. Pat. No. 3,741,240 to Berriman is an example of a fluid regulator that operates in response to the operational demands of remote fluid utilization equipment. The range of control of the regulator disclosed in this patent, however, is somewhat limited by the use of a thin metal flexible diaphragm that responds to pressures changes in the output fluid flow and the level of the vacuum from the manifold to regulate the output pressure.

SUMMARY OF THE INVENTION

A fluid flow pressure regulator, constructed in accordance with the present invention, includes a housing having an inlet port through which a fuel is introduced at an input pressure, an outlet port through which the fuel is discharged at an output pressure, and a bias port through which a biasing pressure is introduced. Also included in this fluid flow pressure regulator is a valve unit in the housing between the inlet port and the outlet port for regulating the pressure of fuel flow from the inlet port to the outlet port. A fluid flow pressure regulator, constructed in accordance with the present invention, further includes a piston in the housing coupled to the valve unit and responsive to the output pressure at the outlet port for urging the valve unit toward closing and the biasing pressure introduced through the bias port for one of urging the valve toward closing and urging the valve to open. A spring acting on the piston against the outlet pressure to urge the valve unit to close also is included in this fluid flow pressure regulator.

DETAILED DESCRIPTION OF THE INVENTION

Figure 1:
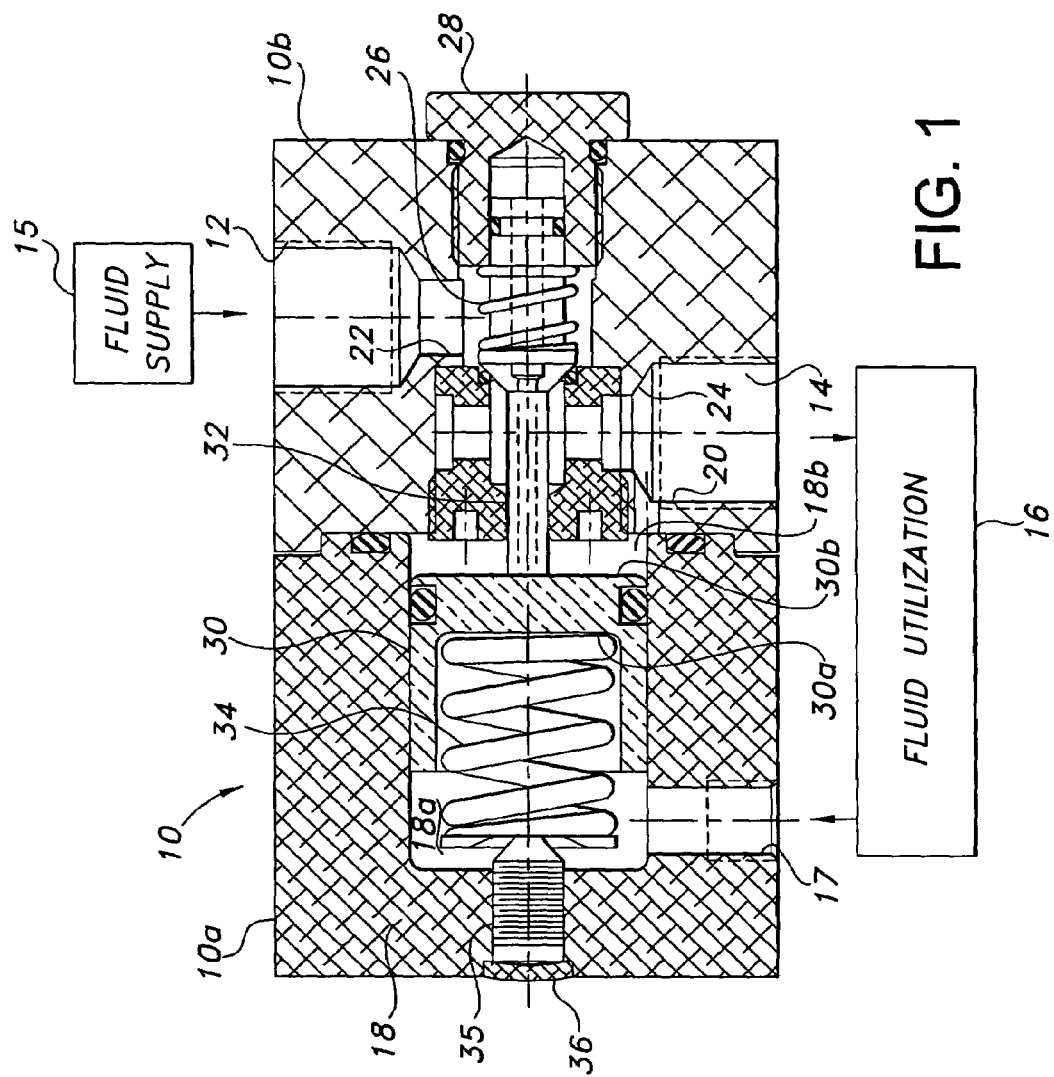
FIG. 1 is a cross-sectional view of a first embodiment of a fluid flow pressure regulator constructed in accordance with the present invention.

Referring to FIG. 1, a fluid flow pressure regulator, constructed in accordance with the present invention, includes a housing 10 having an inlet port 12 through which a fluid is introduced at a supply pressure and an outlet port 14 through which the fluid is discharged at an output pressure. Fluid is supplied from a fluid supply 15, such as a fuel storage system and vaporizer, at an input pressure and fluid is discharged to a fluid utilization 16, such as an engine, at an output pressure.

Housing 10 also has a bias port 17 through which a biasing pressure is introduced, a cavity 18 in fluid communication with the bias port, and an aspirator passage 20 extending between the outlet port and the cavity through which the output pressure is conducted from the outlet port to the cavity. As illustrated, housing 10 is in two parts 10a and 10b that are held together by suitable means not shown.

The source of biasing pressure can be, for example, an engine manifold and the biasing pressure can be either a partial vacuum or greater than atmospheric pressure, depending on the operational demand of the fluid utilization (e.g., an engine) to which the fluid is delivered. The effect of the biasing pressure is explained below.

A fluid flow pressure regulator, constructed in accordance with the present invention, also includes a valve assembly within housing 10 for regulating the pressure of fluid flow from inlet port 12 to outlet port 14. This valve assembly includes a valve unit composed of a nozzle 22 between inlet port 12 and outlet port 14 through which fluid flows from the inlet port to the outlet port and a valve 24 movable toward the nozzle and away from the nozzle. In the FIG. 1 embodiment of the present invention, valve 24 is a conical poppet valve.

Also included in the valve assembly are means for urging valve 24 toward nozzle 22. For the embodiment of the invention being described, such means include a compression spring 26 having a first end bearing against valve 24 and a second end bearing against a plug 28 threaded into housing 10.

The valve assembly of FIG. 1 further includes a pressure set point assembly in cavity 18. This pressure set point assembly includes a piston pressure sensor 30 and means acting on the piston pressure sensor for urging valve 24 away from nozzle 22. Piston pressure sensor 30 controls the position of valve 24 relative to nozzle 22 by means of a coupling 32 extending between the piston pressure sensor and the valve and, for the embodiment of the invention being described, a compression spring 34 acts on the piston pressure sensor for urging the valve away from the nozzle. A first end of compression spring 34 bears against a first face 30a of piston pressure sensor 30 and a second end of this compression spring bears against a calibration adjustment screw 35 which is threaded into part 10a of housing 10 and sealed with a plug 36. Face 30a of piston pressure sensor 30 includes the surface against which spring 34 bears and the edges of the piston pressure sensor at the opening into which spring 34 extends. In effect, piston pressure sensor 30 divides cavity 18 into a first part 18a and a second part 18b.

The spring force of spring 34 is high relative to the spring force of spring 26, so that valve 24, at the outset and in the absence of any other influences, is spaced from nozzle 22.

The valve assembly, and, in particular, piston pressure sensor 30, is responsive to the biasing pressure introduced through bias port 17 into part 18a of cavity 18 and received at face 30a of the piston pressure sensor to urge valve 24 away from nozzle 22. Piston pressure sensor 30 also is responsive to the output pressure conducted from outlet port 14 through aspirator passage 20 into part 18b of cavity 18 and received at a second face 30b of piston pressure sensor for urging valve 24 toward nozzle 22. The net effect of the output pressure, the biasing pressure, and spring 34 on piston pressure sensor 30 is either to urge valve 24 toward nozzle 22 or to urge the valve away from the nozzle.

In operation, when, for example, an ignition switch is turned on, fluid passes from inlet port 12 to outlet port 14 because spring 34, acting on piston pressure sensor 30, causes valve 24 to be spaced from nozzle 22 by the effect of the spring 34 on the piston pressure sensor which is transmitted through coupling 32 to the valve. The pressure of the output fluid at outlet port 14 is conducted through aspiration tube 20 to face 30b of piston pressure sensor 30. This output pressure acts on piston pressure sensor 30 against the action of spring 34 and moves valve 24 toward nozzle 22. This causes a reduction in the output pressure at outlet port 14. The reduction in output pressure at outlet port 14 reduces the opposition to spring 34 and permits piston pressure sensor to move valve 24 away from nozzle 22. This operation continues until a balance or equilibrium condition is achieved allowing valve 24 to throttle the flow of fluid based on pressure.

Also contributing to the balance of forces on piston pressure sensor 34 is the biasing pressure introduced at bias port 17. When the biasing pressure is a partial vacuum, the biasing pressure opposes the action of spring 34 and causes valve 24 to move toward nozzle 22. When the biasing pressure is greater than atmospheric pressure (e.g., when the fluid utilization is a supercharged engine or a turbocharged engine), the biasing pressure supports the action of spring 34 and causes valve 24 to move away from nozzle 22.

Under steady state conditions, an increased biasing pressure, whether a partial vacuum or greater than atmospheric, acts to effect movement of piston pressure sensor 30 to maximize the spacing between valve 24 and nozzle 22 with an increase in fluid flow and increased output pressure at outlet port 14. A decreased biasing pressure, whether a partial vacuum or atmospheric, acts to effect movement of piston pressure sensor 30 to minimize the spacing between valve 24 and nozzle 22 with a decrease in fluid flow and decreased output pressure at outlet port 14.

For the FIG. 1 embodiment of the present invention, with the outside diameter of piston pressure sensor 30 the same throughout its length, the biasing pressure ratio is proportional, namely 1:1. This is because the area of face 30b of piston pressure sensor 30 over which the output pressure is applied is the same as the area over which the biasing pressure is applied, namely face 30a of the piston pressure sensor that includes the surface against which spring 34 bears and the edges of the piston pressure sensor at the opening into which spring 34 extends.

Figure 3:
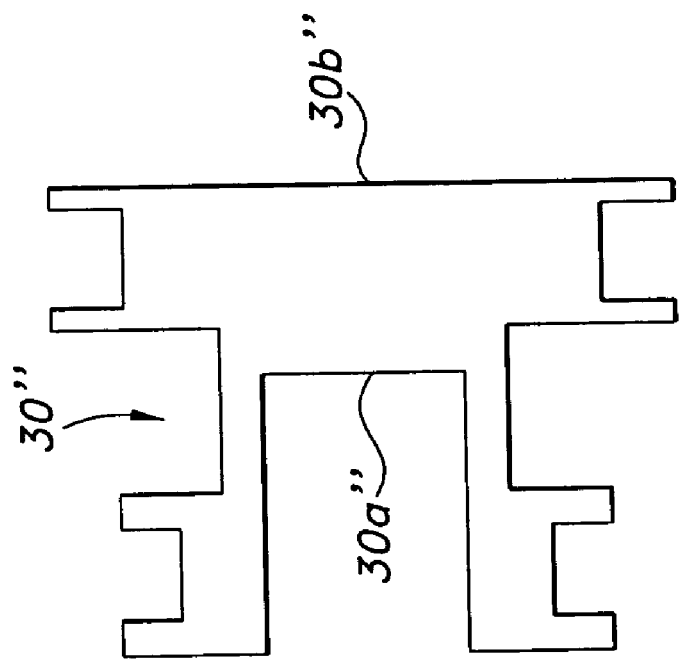
FIG. 3 is a cross-sectional view of a third embodiment of a piston pressure sensor of a fluid flow pressure regulator constructed in accordance with the present invention.
Figure 2:
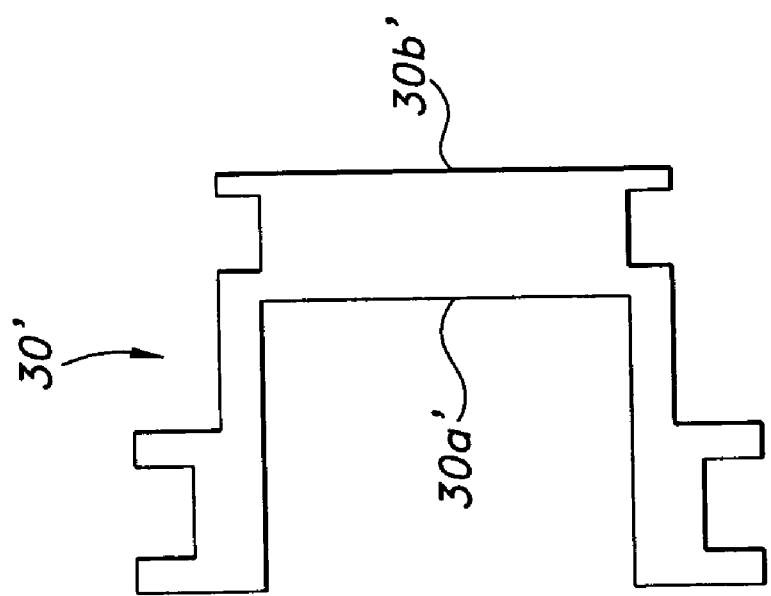
FIG. 2 is a cross-sectional view of a second embodiment of a piston pressure sensor of a fluid flow pressure regulator constructed in accordance with the present invention.

In the FIG. 2 embodiment of the piston pressure sensor, the outside diameter of piston pressure sensor 30' is stepped, so that the area of face 30b' of piston pressure sensor over which the output pressure is applied is less than the area over which the biasing pressure is applied, namely face 30a' of the piston pressure sensor that includes the surface against which spring 34 bears and the edges of the piston pressure sensor at the opening into which spring 34 extends. In the FIG. 2 embodiment of the piston pressure sensor, the biasing pressure ratio is boosted and is greater than 1:1. In the FIG. 3 embodiment of the piston pressure sensor, the outside diameter of piston pressure sensor 30b" is stepped, so that the area of face 30b" of piston pressure sensor over which the output pressure is applied is greater than the area over which the biasing pressure is applied, namely face 30a" of the piston pressure sensor that includes the surface against which spring 34 bears and the edges of the piston pressure sensor at the opening into which spring 34 extends. In the FIG. 3 embodiment of the piston pressure sensor, the biasing pressure ratio is reduced and is less than 1:1. The unique requirements of different engine fuel management systems determine the design of the piston pressure sensor. In all other respects, a fluid flow pressure regulator having the piston pressure sensor 30' of FIG. 2 or the piston pressure sensor 30" of FIG. 3 is the same as the fluid flow pressure regulator of FIG. 1

To avoid input pressure fluctuations affecting the output pressure, a fluid flow pressure regulator, constructed in accordance with the present invention, preferably includes a balanced valve having a piston cylinder 38, a balance piston 40 movable within piston cylinder 38 and coupled to piston pressure sensor 30 valve 24. The balanced valve also has a seal 42 between balance piston 40 and piston cylinder 38. A pressure equalization passage 44 extends through valve 24 and balance piston 40 from the second part 18b of cavity 18. This balanced valve, of conventional construction and operation, counterbalances both the forces acting to move valve 24 toward nozzle 22 due to the input pressure and the forces acting to move valve 24 away from nozzle 22 due to the output pressure.

When used in the delivery of liquid petroleum gas to an engine, the fluid pressure regulator of the present invention, by operating in response to the operating conditions of the engine, delivers the fuel at a pressure that is most suitable for low emission fuel control system designs. Another important benefit of the present invention is that this pressure regulator can withstand the temperature and vibration requirements of an engine mounted in an automobile.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A pressure regulator comprising:
  a housing having:
  (a) an inlet port through which a fluid is introduced at a supply pressure,
  (b) an outlet port through which the fluid is discharged at an output pressure,
  (c) a bias port through which a biasing pressure is introduced,
  (d) a cavity in fluid communication with said bias port, and
  (e) an aspirator passage extending between said outlet port and said cavity through which the output pressure is conducted from said outlet port to said cavity; and
  a valve assembly within said housing for regulating the pressure of fluid flow from said inlet port to said outlet port and having:
  (a) a nozzle between said inlet port and said outlet port through which fluid flows from said inlet port to said outlet port,
  (b) a valve movable toward said nozzle and away from said nozzle,
  (c) means for urging said valve toward said nozzle, (d) a pressure set point assembly in said cavity and having:
  (1) a piston pressure sensor, and
  (2) means acting on said piston pressure sensor for urging said valve away from said nozzle, and
(e) a coupling extending between said piston pressure sensor and said valve, and
responsive to:
(a) the output pressure conducted from said outlet port through said aspirator passage to said piston pressure sensor for urging said valve toward said nozzle, and
(b) the biasing pressure introduced through said bias port to said piston pressure sensor for one of:
  (1) urging said valve toward said nozzle, and
  (2) urging said valve away from said nozzle,
said piston pressure sensor having:
  (1) a first face:
    (i) against which an end of said second spring bears urging said valve away from said nozzle, and
    (ii) that receives biasing pressure from said bias port for one of:
      urging said valve toward said nozzle, and
      urging said valve away from said nozzle, and
  (2) a second face that receives output fluid pressure conducted from said outlet port through said aspirator passage for urging said valve toward said nozzle, the area of said first face being different than the area of said second face.

2. A fluid flow pressure regulator according to claim 1 wherein said piston pressure sensor divides said cavity into a first part that receives output fluid pressure conducted from said outlet port through said aspirator passage and a second part that receives biasing pressure from said bias port.

3. A fluid flow pressure regulator according to claim 2 wherein said valve assembly further includes a balanced valve having:
  (a) a piston cylinder,
  (b) a balance piston movable within said piston cylinder and coupled to said piston of said pressure set point assembly through said valve,
  (c) a seal between said balance piston and said piston cylinder, and
  (d) a pressure equalization passage extending through said valve and said balance piston from said first part of said cavity.

4. A fluid flow pressure regulator according to claim 1 wherein the biasing pressure is a partial vacuum.

5. A fluid flow pressure regulator according to claim 1 wherein the biasing pressure is greater than atmospheric pressure.

6. A fluid flow pressure regulator according to claim 1 wherein the area of said first face of said piston pressure sensor is greater than the area of said second face of said piston pressure sensor.

7. A fluid flow pressure regulator according to claim 1 wherein the area of said first face of said piston pressure sensor is less than the area of said second face of said piston pressure sensor.

8. A pressure regulator for use in an automotive liquid petroleum gas fuel system, said regulator comprising:
  a first housing part having an inlet port for connection with a supply of high pressure liquid petroleum gas, an outlet port for connection with an automotive engine, and a flow passage formed therebetween;
  a valve unit in said flow passage, said valve unit including a nozzle between the inlet and outlet ports and a valve moveable in said flow passage towards and away from the nozzle, the valve unit further including a first compression spring urging the valve toward the nozzle; and
  a piston pressure regulator including a second housing part forming a cavity adjacent the first housing part, a piston slideably carried in the cavity and dividing said cavity into a first cavity part and a second cavity part, said second housing part being formed with a bias port adjacent said first cavity part for connection with a biasing pressure from an automotive engine manifold, an aspirator passage formed in one of said body parts for communication between the outlet side of said flow passage and said second cavity part, a first face of the piston being located in said first cavity part whereby the first face is in communication with said bias port and said automotive engine manifold; a second face of the piston being located in said second cavity part whereby said second face is in communication with said aspirator passage and said outlet side of said flow passage; the piston pressure regulator further including a second compression spring bearing on the first face of the piston for urging the valve away from the nozzle, the biasing pressure in the first cavity part and the second compression spring being the only forces acting against the first compression spring, the area of the first face being different than the area of the second face.

9. A pressure regulator in accordance with claim 8 wherein the area of the first face is greater than the area of the second face.

10. A pressure regulator in accordance with claim 8 wherein the area of the first face is less than the area of the second face.

11. A pressure regulator in accordance with claim 8 further comprising a resilient seal ring between the wall bounding the cavity and the piston.

* * * * *